(12) United States Patent
Lefebvre et al.

(10) Patent No.: US 11,377,974 B2
(45) Date of Patent: Jul. 5, 2022

(54) MECHANICAL REDUCTION GEAR FOR AN AIRCRAFT TURBINE ENGINE

(71) Applicant: SAFRAN TRANSMISSION SYSTEMS, Colombes (FR)

(72) Inventors: Simon Loïc Clément Lefebvre, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/495,209

(22) Filed: Oct. 6, 2021

(65) Prior Publication Data

US 2022/0112816 A1  Apr. 14, 2022

(30) Foreign Application Priority Data

Oct. 8, 2020  (FR) ...................................... 2010268

(51) Int. Cl.
| | |
|---|---|
| *F16H 1/28* | (2006.01) |
| *F01D 15/12* | (2006.01) |
| *F16H 55/17* | (2006.01) |
| *F16H 57/04* | (2010.01) |
| *F16H 57/08* | (2006.01) |

(52) U.S. Cl.
CPC .............. *F01D 15/12* (2013.01); *F16H 1/28* (2013.01); *F16H 55/17* (2013.01); *F16H 57/043* (2013.01); *F16H 57/0479* (2013.01); *F16H 57/0486* (2013.01); *F16H 57/082* (2013.01); *F05D 2220/323* (2013.01); *F05D 2260/40311* (2013.01)

(58) Field of Classification Search
CPC ...... F16H 1/28; F16H 57/043; F16H 57/0479; F16H 57/082
See application file for complete search history.

(56) References Cited

U.S. PATENT DOCUMENTS

| | | |
|---|---|---|
| 1,968,604 A | 7/1934 | Hertz et al. |
| 8,820,478 B2 | 9/2014 | Gauthier et al. |
| 8,876,647 B2 | 11/2014 | Gallet et al. |

(Continued)

FOREIGN PATENT DOCUMENTS

| | | |
|---|---|---|
| CN | 202900551 U | 4/2013 |
| FR | 2987416 A1 | 8/2013 |

(Continued)

OTHER PUBLICATIONS

French Preliminary Search Report dated May 28, 2021, issued in corresponding French Application No. 2010268, filed on Oct. 8, 2020, 2 pages.

*Primary Examiner* — Derek D Knight
(74) *Attorney, Agent, or Firm* — Christensen O'Connor Johnson Kindness PLLC (57) ABSTRACT

A mechanical reduction gear of a turbine engine, in particular for an aircraft, includes a sun gear having external toothing, a ring gear which extends around the sun gear and has internal toothing, planet gears which are in mesh with the sun gear and the ring gear and which have toothings of different diameters, a planet carrier which supports bearings for guiding the planet gears in rotation, and a lubrication circuit of the reduction gear. The planet carrier has a hydrodynamic abutment on which the sun gear is configured to bear axially.

15 Claims, 5 Drawing Sheets

(56) References Cited

U.S. PATENT DOCUMENTS

| | | | |
|---|---|---|---|
| 10,458,279 B2 | 10/2019 | Gedin et al. | |
| 10,816,088 B2 | 10/2020 | Lefebvre et al. | |
| 11,112,001 B2 | 9/2021 | Dombek et al. | |
| 2016/0238126 A1 | 8/2016 | Beck et al. | |
| 2016/0290480 A1* | 10/2016 | Sada | F16H 57/0453 |
| 2016/0377167 A1* | 12/2016 | Sheridan | F16H 57/0486 |
| | | | 60/226.1 |
| 2018/0247236 A1 | 8/2018 | Castinado | |
| 2019/0011039 A1* | 1/2019 | Yugi | F16C 19/48 |
| 2020/0247236 A1 | 8/2020 | Hirao et al. | |
| 2021/0062911 A1 | 3/2021 | Rappaport et al. | |

FOREIGN PATENT DOCUMENTS

| | | |
|---|---|---|
| FR | 3011901 A1 | 4/2015 |
| FR | 3041054 A1 | 3/2017 |
| FR | 3058493 A1 | 5/2018 |
| FR | 3066792 A1 | 11/2018 |
| FR | 3069301 A1 | 1/2019 |
| FR | 3076336 A1 | 7/2019 |
| JP | 2018017392 A | 2/2018 |
| WO | 2010092263 A1 | 8/2010 |

\* cited by examiner

MECHANICAL REDUCTION GEAR FOR AN AIRCRAFT TURBINE ENGINE

CROSS-REFERENCE TO RELATED APPLICATION

This application claims priority to French Patent Application No. 2010268, filed Oct. 8, 2020, the entire disclosure of which is hereby incorporated by reference for all purposes.

TECHNICAL FIELD

The present disclosure relates to the field of mechanical reduction gears for turbine engines, for example for aircraft, and for example to reduction gears equipped with double-meshing planet gears.

BACKGROUND

The prior art includes the documents WO-A1-2010/092263, FR-A1-2 987 416, FR-A1-3 011 901, FR-A1-3 041 054, FR-A1-3 058 493, FR-A1-3 066 792, FR-A1-3 069 301, FR-A1-3 076 336, CN-U-202 900 551, JP-A-2018 017392, US-A1-2018/247236 and U.S. Pat. No. 1,968,604.

The role of a mechanical reduction gear is to change the speed and torque ratio between the input axle and the output axle of a mechanical system.

The new generations of multi-flow turbine engine, in particular, those with high bypass ratios, comprise a mechanical reduction gear to drive the shaft of a ducted or unducted propeller (also known as a fan). The purpose of the reduction gear is usually to transform the so-called fast rotation speed of the shaft of a power turbine into a slower rotation speed for the shaft driving the propeller.

Such a reduction gear includes a central pinion, called a sun gear, a ring gear and pinions called planet gears, which are engaged between the sun gear and the ring gear. The planet gears are held by a frame called a planet carrier. The sun gear, the ring gear and the planet carrier are planetary gears because their axes of revolution coincide with the longitudinal axis X of the turbine engine. The planet gears each have a different axis of revolution and are on the same operating diameter around the planetary axis. These axes are parallel to the longitudinal axis X.

There are several reduction gear architectures. In the prior art of multi-flow turbine engines, the reduction gears are of the planetary or epicyclic type. In other similar applications, there are so-called differential or compound architectures.

In a planetary reduction gear, the planet carrier is fixed and the ring gear is the output shaft of the device which rotates in the opposite direction of the sun gear.

In an epicyclic reduction gear, the ring gear is fixed and the planet carrier consist of the output shaft of the device which rotates in the same direction as the sun gear.

On a compound reduction gear, no element is fixed in rotation. The ring gear rotates in the opposite direction to the sun gear and the planet carrier.

The reduction gears can be composed of one or more meshing stages. This meshing is achieved in different ways such as by contact, friction or magnetic fields.

In the present application, "stage" or "toothing" means a series of meshing teeth with a series of complementary teeth. A toothing may be internal or external.

A planet gear may comprise one or two meshing stages. A single-stage planet gear comprises a set of toothing which may be straight, helical or herringbone-shaped and whose teeth are located on the same diameter. This toothing cooperates with both the sun gear and the ring gear.

A double-stage planet gear comprises two toothings or two sets of teeth that are located on different diameters. A first set of toothing cooperates with the sun gear and a second toothing cooperates with the ring gear.

In addition, each planet gear is centered and guided in rotation around an axis by a bearing which is carried by the planet carrier.

In a reduction gear of this type, the sun gear is likely to move axially during operation, in particular when coupled to its drive shaft by a set of straight splines parallel to its axis of rotation.

The sun gear may comprise a straight toothing in mesh with complementary straight toothings of the planet gear. In this case, the sun gear is also susceptible to axial movement during operation.

The sun gear may comprise a helical toothing in mesh with helical toothings complementary to the planet gears. In this case, this meshing generates axial forces on the toothing of the sun gear which must be taken up in order to limit stress concentrations in the sun gear. Moreover, if this axial force is not taken up by an abutment, the sun gear may move axially and touch a stator or disengage from the planet gears.

It is therefore useful or even necessary to guarantee the axial position of the sun gear during operation. However, it is important to maintain a certain degree of freedom in the radial direction of the sun gear in the reduction gear in order to avoid a hyperstatic effect which would be detrimental to the operation of the reduction gear.

One solution is to guide the sun gear in relation to the planet carrier by means of a ball bearing which allows the axial forces to which the sun gear is subjected during operation to be taken up. However, the disadvantage of this solution is the large axial dimensions of the bearing.

There is therefore a need to identify a simple and effective solution to this problem of axial positioning and taking up the forces of the sun gear during operation.

SUMMARY OF THE INVENTION

The present disclosure relates to a mechanical reduction gear of a turbine engine, in particular an aircraft, this reduction gear comprising:
  a sun gear having an axis of rotation and comprising external toothing,
  a ring gear which extends around the sun gear and which comprises an internal toothing,
  planet gears which are in mesh with the sun gear and the ring gear and which each comprise a first toothing which has an average diameter and which is in mesh with the toothing of the sun gear, and a second toothing which has an average diameter and which is in mesh with the internal toothing of the ring gear, said average diameter of the second toothing being different from the average diameter of the first toothing,
  a planet carrier which supports bearings for guiding the planet gears in rotation around second axes parallel to the first axis, and
  a lubrication circuit of the reduction gear,
  the planet carrier comprising at least one axial abutment which comprises a bearing surface on which said sun gear is intended to bear axially during operation, said lubrication circuit comprising at least one channel configured to convey oil onto said bearing surface and to form a film of oil between this bearing surface and the sun gear.

The present disclosure thus proposes to equip the reduction gear with a hydrodynamic abutment configured to cooperate with the sun gear.

In the present application, "hydrodynamic abutment" means an abutment on which a film of oil is present.

The sun gear is configured to bear axially on the abutment, with the film of oil interposed between the sun gear and the bearing surface of the abutment. The abutment can thus ensure correct axial positioning of the sun gear during operation, and/or take up the axial forces to which the sun gear is subjected during operation.

In addition, the sun gear retains freedom of radial movement relative to the sun gear, sliding in a radial direction on the film of oil.

Finally, the device of the present disclosure is advantageous in that it does not affect the axial dimensions of the reduction gear.

The reduction gear according to the present disclosure may comprise one or more of the following features, taken in isolation from each other, or in any combination with each other:
- said at least one channel is formed in the planet carrier or in an element carried by the planet carrier;
- the abutment and the bearing surface are generally annular in shape and extend around said first axis;
- the abutment is formed or carried by an internal annular ledge of the planet carrier;
- said at least one channel extends or is formed in part in said ledge;
- said lubrication circuit comprises at least one channel extending in the planet carrier perpendicularly to said first axis and at least one other channel extending in the planet carrier, parallel to said first axis, said at least one channel extending from said at least one other channel to the level of said bearing surface;
- a washer or coating of anti-friction material is located on said bearing surface;
- the washer is engaged on a cylindrical shaft of said planet carrier, this cylindrical shaft extending around said first axis;
- said at least one abutment is located on one side of the sun gear, and said reduction gear comprises another axial abutment located on the opposite side to the sun gear and on which the sun gear is adapted to bear axially in operation;
- said at least one channel comprises a radially inner end connected to an oil outlet port;
- said oil outlet port opens onto said bearing surface so as to supply it with oil and to form a film of oil extending over the bearing surface.

The present disclosure also relates to an aircraft turbine engine, comprising a reduction gear as described above.

BRIEF DESCRIPTION OF THE FIGURES

Further features and advantages will be apparent from the following description of a non-limiting embodiment of the present disclosure with reference to the attached drawings, in which.

DETAILED DESCRIPTION

Figure 1:
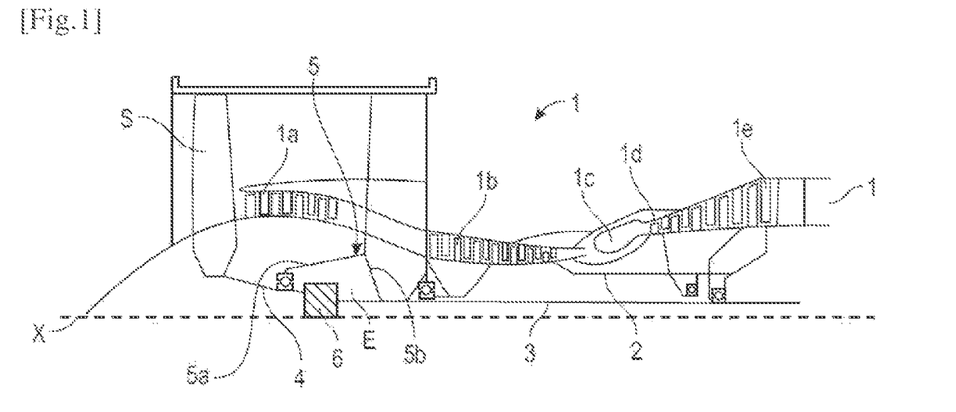
FIG. 1 is a schematic view in axial section of an aircraft turbine engine.

FIG. 1 describes a turbine engine 1 which conventionally comprises an axis of rotation X, a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together form a high-pressure (HP) body. The low-pressure compressor 1a and the low-pressure turbine 1e are connected by a low-pressure shaft 3 and together form a low-pressure (LP) body.

The fan S is driven by a fan shaft 4 which is driven to the LP shaft 3 by means of a reduction gear 6. This reduction gear 6 is generally of the planetary or epicyclic type.

The following description relates to a planetary type reduction gear in which the ring gear is mobile in rotation.

The reduction gear 6 is positioned in the upstream part of the turbine engine. A fixed structure comprising schematically, here, an upstream part 5a and a downstream part 5b which makes up the engine casing or stator 5 is arranged so as to form an enclosure E surrounding the reduction gear 6. This enclosure E is closed upstream by seals at the level of a bearing allowing the passage of the fan shaft 4, and downstream by seals at the level of the passage of the LP shaft 3.

Figure 2:
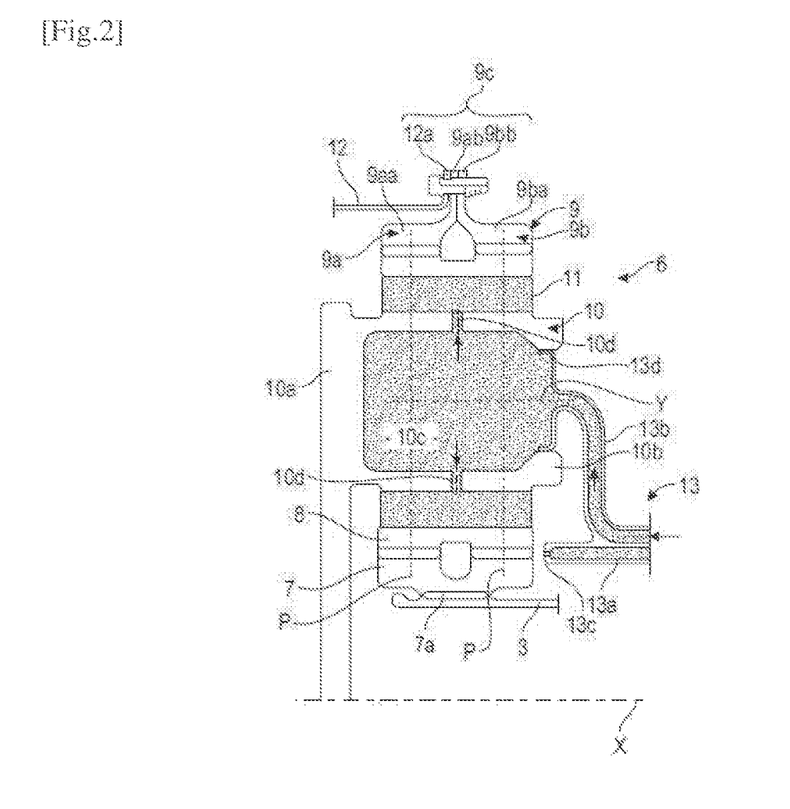
FIG. 2 is a partial view in axial section of a mechanical reduction gear.

FIG. 2 shows a reduction gear 6 which can take the form of different architectures depending on whether certain parts are fixed or in rotation. On the input side, the reduction gear 6 is connected to the LP shaft 3, for example via internal splines 7a. Thus, the LP shaft 3 drives a planetary pinion called the sun gear 7. Classically, the sun gear 7, whose axis of rotation is coincident with that of the turbine engine X, drives a series of pinions called planet gears 8, which are equally spaced on the same diameter around the axis of rotation X. This diameter is equal to twice the operating center distance between the sun gear 7 and the planet gears 8. The number of planet gears 8 is generally defined between three and seven for this type of application.

The planet gears 8 are held together by a frame called a planet carrier 10. Each planet gear 8 rotates around its own axis Y, and meshes with the ring gear 9.

In this planetary configuration, all the planet gears 8 are held by a planet carrier 10, which is attached to the engine casing or stator 5. Each planet gear drives the ring gear which is attached to the fan shaft 4 via a ring gear carrier 12.

Each planet gear 8 is mounted freely in rotation by means of a bearing 11, for example a bearing or hydrodynamic bearing. Each bearing 11 is mounted on one of the axles 10b of the planet carrier 10 and all the axles are positioned with respect to each other by means of one or more structural frames 10a of the planet carrier 10. There are a number of axles 10b and bearings 11 equal to the number of planet gears. For reasons of operation, assembly, manufacture, inspection, repair or replacement, the axles 10b and the frame 10a may be separated into several parts.

For the same reasons as mentioned above, the toothing of a reduction gear can be separated into several helices, each with a median plane P. In the example shown, the ring gear is separated into two half ring gears:

an upstream half ring gear 9a consisting of a rim 9aa and an attachment half flange 9ab. On the rim 9aa is the upstream helix of the toothing of the reduction gear. This upstream helix meshes with that of the planet gear 8 which meshes with that of the sun gear 7.

a downstream half-ring gear 9b consisting of a rim 9ba and an attachment half-flange 9bb. The downstream helix of the toothing of the reduction gear is located on the rim 9ba. This downstream helix meshes with that of the planet gear 8 which meshes with that of the sun gear 7.

The attachment half-flange 9ab of the upstream ring gear 9a and the attachment half-flange 9bb of the downstream ring gear 9b form the attachment flange 9c of the ring gear. The ring gear 9 is attached to a ring gear carrier by joining the attachment flange 9c of the ring gear and the attachment flange 12a of the ring gear carrier by means of a bolted connection, for example.

The arrows in FIG. 2 describe the oil flow in the reduction gear 6. The oil enters the reduction gear 6 from the stator part 5 into a turbine stator vane 13 by different means, which will not be specified in this view because they are specific to one or more types of architecture. The turbine stator vane is separated into two parts, each of which is repeated by the same number of planet gear. The function of the injectors 13a is to lubricate the toothings and the function of the arms 13b is to lubricate the bearings. The oil is fed to the injector 13a and exits through the end 13c to lubricate the toothing. The oil is also fed to the arm 13b and circulates through the inlet 13d of the bearing. The oil then flows through the axle into a buffer zone(s) 10c and exit through the ports 10d to lubricate the bearing of the planet gears.

Figure 3:
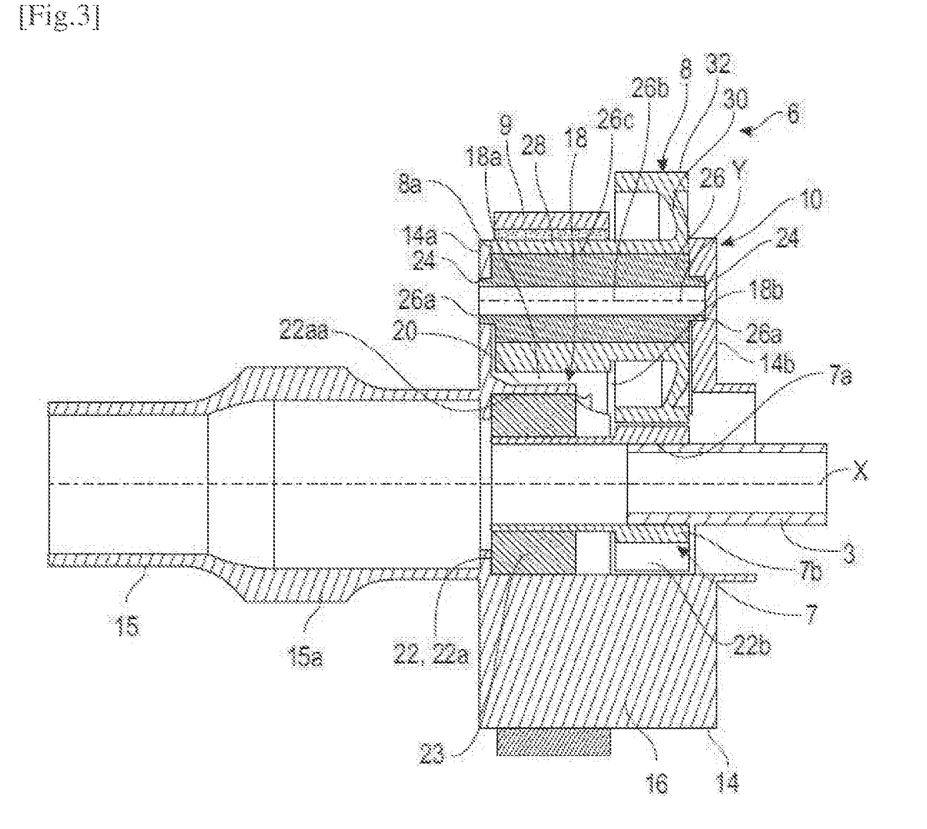
FIG. 3 is a schematic view in axial section of a mechanical reduction gear with double-meshing planet gears, and illustrates the prior art.

FIG. 3 shows an aircraft turbine engine reduction gear 6 in the prior art.

The reduction gear 6 comprises a planet carrier 10 which is configured to be mobile in rotation around the axis X and which is of the monobloc type, i.e. formed in a single piece.

This planet carrier 10 comprises a cage 14 and a shaft portion 15.

The shaft portion 15 is generally tubular and elongated along the axis X and comprises a free longitudinal end, here on the left in the drawings, and an opposite longitudinal end for connection to the cage 14.

The shaft portion 15 comprises an external toothing 15a for meshing, for example with a fan.

The cage 14 comprises two annular shrouds 14a, 14b which are parallel and spaced apart from each other and extend perpendicularly to the axis X. The shrouds 14a, 14b are generally circular in shape and are centered on the axis X.

The shroud 14a, referred to as the first shroud, on the left in the drawing, is connected to the shaft portion 15. The other shroud 14b is called the second shroud.

The shrouds 14a, 14b are connected to each other by material bridges 16 which define between them and with the shrouds housings 18 configured to receive the planet gears 8. The housings 18 open radially outwards at the outer periphery of the cage 14, and also open radially inwards through an inner tubular wall 20 of the cage 14. The material bridges 16 may be solid or partially recessed, as illustrated in FIG. 3.

The wall 20 extends around the axis X from the first shroud 14a towards the second shroud 14b. It extends here substantially in the axial extension of the shaft portion 15. This wall 20 internally delimits a space 22 for housing the sun gear 7.

This space 22 comprises two adjacent parts. The first part 22a is surrounded by the wall 20, which comprises an internal cylindrical surface 22a for mounting a bearing 23 for guiding one end of the sun gear 7. The second part 22b, located at the level of the openings of the housings 18, receives the opposite end of the sun gear 7, which comprises an external toothing 7b for meshing with the planet gears 8. The sun gear 7 also comprises an internal toothing 7a for coupling to a shaft, for example of a turbine.

The housings 18 each comprise a first part 18a which is located on the side of the first shroud 14a, and a second part 18b which is located on the side of the second shroud 14b. The housings 18 open at the outer periphery of the cage 14 at both parts 18a, 18b and at the inner periphery of the cage 14 at the second parts 18b only.

The shrouds 14a, 14b comprise aligned holes or ports 24 for mounting the planet gears 8 and in particular hydrodynamic bearings 26 for guiding these planet gears 8.

Each hydrodynamic bearing 26 comprises a body around which a film of oil under pressure is located.

Figure 4:
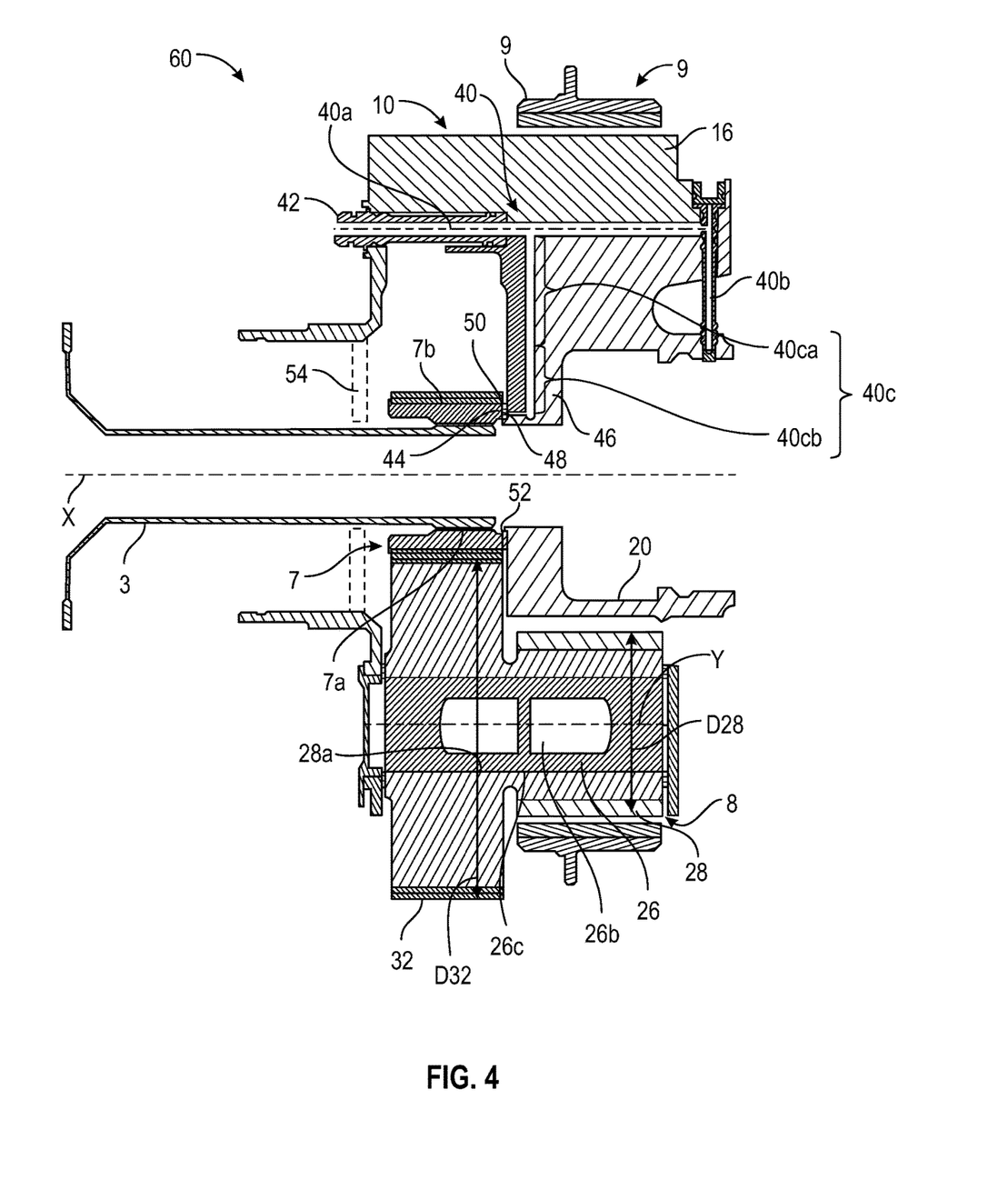
FIG. 4 is a schematic view in axial section of a mechanical reduction gear with double-meshing planet gears, and illustrates an embodiment of a mechanical reduction gear according to the present disclosure.

The body of a bearing 26 is shown alone in FIG. 4. It is generally cylindrical in shape extending along the axis Y, the longitudinal ends of which comprise extensions 26a housed in seat-forming ports 24.

The body of the bearing 26 may also be tubular and comprise an internal oil circulation bore 26b which generally communicates with oil supply ducts to an external cylindrical surface 26c of the body for the formation of the oil film between that surface 26c and an internal cylindrical surface of the planet gear 8.

The planet gears 8 are of the type with a double meshing stage, as mentioned above, and each comprise a tubular body 8a connected by a web 30 to a first external toothing 32, the body 8a itself being equipped with a second toothing 28.

The toothings 28, 32 are arranged next to each other and more particularly are located respectively in two planes perpendicular to the axis Y.

The second toothing 28, located on the left in the drawings, is located on the side of the first shroud 14a and thus at the level of the first part 18a of the housing. As can be seen in FIG. 3, this toothing 28 is in mesh with the ring gear 9.

The first toothing 32, located on the right side of the drawings, is located on the side of the second shroud 14b and thus at the level of the second part 18b of the housing. As can be seen in FIG. 3, this toothing 32 is in mesh with the toothing 7b of the sun gear 7.

The ring gear 9 is carried by a ring gear carrier which is not shown in the drawings.

The present disclosure provides a solution to guarantee the axial position of the sun gear 7 and/or to take up the axial forces to which the sun gear is subjected in operation, in particular, when the toothing 7b and 32 are helical.

Figure 5:
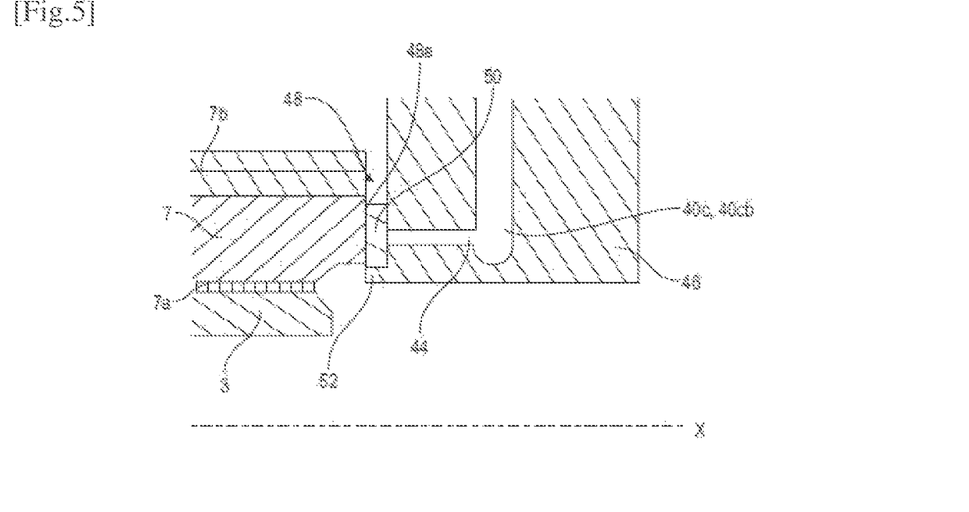
FIG. 5 is a larger scale view of a portion of FIG. 4.

FIGS. 4 and 5 illustrate a representative and non-limiting embodiment of a reduction gear 60 according to the present disclosure.

The reduction gear 60 of FIGS. 4 and 5 includes all the features of the reduction gear 6 described in the foregoing in relation to FIG. 3 insofar as they are not contrary to or do not contradict what follows.

The references used in FIGS. 4 and 5 and already used in FIG. 3 therefore designate identical or similar elements.

The planet gear 8 is of the double-gear type and comprises a first toothing 32 and a second toothing 28.

The toothings 28, 32 are arranged next to each other and more particularly are located in two planes perpendicular to the axis Y.

The second toothing 28, located on the right-hand side of the drawing, is intended to be engaged with the ring gear 9. The first toothing 32, located on the left side of the drawing, is intended to be in mesh with the toothing 7b of the sun gear 7.

The toothing 28 has a diameter or average diameter D28 which is smaller than the diameter or average diameter D32 of the toothing 32 in the example shown.

The body of the hydrodynamic bearing 26 is hollow and includes an internal oil circulation bore 26b which communicates with a lubrication circuit 40 of the reduction gear. Internal conduits (not shown) are formed in the body of the bearing 26 and convey the oil from the internal bore 26b to the guide surface 26c of the body to form an oil film between this surface 26c and the surface 28a facing the planet gear 8. The surface 26c extends within and opposite the surface 28a and with a predetermined clearance depending on the thickness of the oil film to be interposed between these surfaces.

In the example shown, the lubrication circuit 40 comprises channels 40a, 40b, 40c, etc., formed directly in the planet carrier 10 or elements added and attached to the planet carrier.

A first longitudinal channel 40a extends parallel to the axis X through a major portion of the planet carrier 10 and includes a longitudinal end, shown here on the left in FIG. 4, into which a male fitting 42 for fluid connection to a source of pressurized oil is engaged. The opposite longitudinal end of this first channel 40a, here on the right, is connected to a channel 40b which extends perpendicularly to the first channel 40a and substantially radially with respect to the axis X. This channel 40b allows, for example, oil to be conveyed to the aforementioned bores 26b of the planet gears 8.

The first channel 40a is further connected, substantially in the middle thereof, to a third channel 40c which extends perpendicularly to the first channel 40a and substantially radially with respect to the axis X. The radially outer end of the channel 40c is connected to the channel 40a, and its radially inner end is connected to an oil outlet port 44.

The channel 40c comprises a radially outer portion 40ca formed in one of the aforementioned material bridges 16, and a radially inner portion 40cb formed in an inner annular ledge 46 of the planet carrier. This ledge 46 is connected to all of the material bridges 16 and to the cylindrical wall 20 of the planet carrier 10.

The inner periphery of this ledge 46 forms an axial abutment 48 for the sun gear 7, and, in particular, a hydrodynamic abutment due to its oil supply by the circuit 40 and in particular the channel 40c of the latter.

The abutment 48 comprises a radial surface 48a, here on the left or upstream, on which the sun gear 7 is intended to bear. The oil outlet port 44 opens onto this surface 48a so as to supply it with oil and form a film of oil extending in a radial plane, i.e., perpendicular to the axis X.

The reduction gear 60 may comprise several ports 44 opening onto the surface 48a and connected to several pairs of channels 40a, 40c of the circuit 40.

The sun gear 7 is intended to bear axially on the abutment 48 and the oil film, this abutment 48 being therefore able to take up the axial forces to which the sun gear 7 is subjected during operation so that these forces pass through the planet carrier 10.

Optionally, a washer 50 or an anti-friction coating may be located on the bearing surface 48a. The anti-friction material of the washer 50 or coating limits the contact and frictional wear of the sun gear 7 and the abutment 48. The coating may be applied to the abutment 48 by any suitable technique. The washer 50 may be engaged on a cylindrical shaft 52 of the planet carrier 10 located at the inner periphery of the ledge 46. The washer 50 may be attached and retained on this shaft 52 by shrink fitting, for example.

In operation, the sun gear 7 can thus come to bear axially on the abutment 48 so that the latter takes up the axial forces linked to the meshing of the sun gear 7 with the planet gears 8, as mentioned above.

In the example shown, the abutment 48 is located on one side of the sun gear 7, here on the right or downstream. Alternatively, the abutment 48 could be located on the opposite side, i.e., on the left or upstream. This choice may depend in particular on the winding direction of the toothings 7b, 28, 32 of the sun gear 7 and the planet gears 8, the abutment 48 being intended to be positioned on the side where the sun gear 7 is likely to move in operation because of this winding direction and the directions of rotation of the sun gear and the planet gear.

The reduction gear 60 could be equipped with an optional additional abutment 54 on the opposite side to the abutment 48. This further abutment 54, located on the left in the drawing, would thus comprise a bearing surface on which the sun gear 7 would be able to bear axially in operation.

The present disclosure can provide numerous advantages, including
- a small axial space requirement linked to the axial abutment function of the sun gear, linked to the hydrodynamic abutment technology which uses a thin film of oil,
- the oil is supplied to the film via the existing lubrication circuit of the reduction gear,
- In the event of an oil supply failure, the anti-friction coating or washer ensures continuity of the axial abutment function,
- in case of low load on the sun gear and its displacement on the side opposite to the hydrodynamic abutment, the optional additional abutment can keep the sun gear in position.

Reference throughout this specification to "an embodiment" or "some embodiments" means that a particular feature, structure, or characteristic described in connection with the embodiment is included in at least one embodiment of the present invention. Thus, the appearances of the phrases "in some embodiments" or "in an embodiment" in various places throughout this specification are not necessarily all referring to the same example. Furthermore, the particular features, structures, or characteristics of any embodiment may be combined with any features of any other embodiment to arrive at still other embodiments within the scope of the present disclosure.

This disclosure refers to a number of terms with respect to different embodiments (including apparatuses and methods). Terms having alike names have alike meanings with respect to different embodiments, except where expressly noted. Similarly, this disclosure utilizes a number of terms of art. These terms are to take on their plain and ordinary meaning in the art from which they come, unless specifically defined herein or the context of their use would clearly suggest otherwise.

Spatially relative terms, such as "upstream," "downstream," "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "underneath" can encompass both an orientation of above and below. The device may be otherwise oriented (rotated ninety degrees or at other orientations) and the spatially relative descriptors used herein interpreted accordingly.

The present application may also reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed. The phrase "at least one of A, B, or C" has the same meaning.

The invention claimed is:

1. A mechanical reduction gear of a turbine engine, the mechanical reduction gear comprising:
   a sun gear having a first axis (X) of rotation and comprising an external toothing;
   a ring gear which extends around the sun gear and which comprises an internal toothing;
   planet gears which are in mesh with the sun gear and the ring gear and which each comprise a first toothing which has a first average diameter and which is in mesh with the external toothing of the sun gear and a second toothing which has a second average diameter and which is in mesh with the internal toothing of the ring gear, said second average diameter of the second toothing being different from said first average diameter of the first toothing;
   a planet carrier which supports bearings for guiding the planet gears in rotation around second axes (Y) parallel to the first axis (X); and
   a lubrication circuit of the mechanical reduction gear,
   wherein the planet carrier comprises at least one axial abutment which comprises a bearing surface on which said sun gear is configured to bear axially in operation, said lubrication circuit comprising:
   an annular film of oil between the bearing surface and the sun gear, and
   at least one channel configured to convey oil to said annular film of oil.

2. The mechanical reduction gear of claim 1, wherein said at least one channel is formed in the planet carrier or in an element carried by the planet carrier.

3. The mechanical reduction gear according to claim 1, wherein the at least one axial abutment and the bearing surface are annular in shape and extend around said first axis (X).

4. The mechanical reduction gear according to claim 1, wherein the at least one axial abutment is formed or carried by an internal annular ledge of the planet carrier.

5. The mechanical reduction gear according to claim 4, wherein said at least one channel extends or is formed in part in said ledge.

6. The mechanical reduction gear according to claim 1, wherein said lubrication circuit comprises at least one channel extending in the planet carrier, perpendicularly to said first axis (X), and at least one other channel extending in the planet carrier, parallel to said first axis (X), said at least one channel extending from said at least one other channel to a level of said bearing surface.

7. The mechanical reduction gear according to claim 1, wherein a washer or a coating of anti-friction material is located on said bearing surface.

8. The mechanical reduction gear according to claim 7, wherein the washer is engaged on a cylindrical shaft of said planet carrier, the cylindrical shaft extending around said first axis (X).

9. The mechanical reduction gear according to claim 1, wherein said at least one axial abutment is located on one side of the sun gear, and said reduction gear comprises another axial abutment located on an opposite side of the sun gear and on which the sun gear is adapted to bear axially in operation.

10. An aircraft turbine engine, comprising the mechanical reduction gear according to claim 1.

11. The mechanical reduction gear according to claim 1, wherein said annular film of oil is a non-interrupted annular film of oil.

12. The mechanical reduction gear according to claim 1, wherein said annular film of oil is a thin annular film of oil.

13. The mechanical reduction gear according to claim 1, wherein said annular film of oil is suitable to allow radial movement of said sun gear onto said bearing surface.

14. The mechanical reduction gear according to claim 1, wherein said sun gear is configured to bear axially in operation against said bearing surface either directly or by means of a washer or a coating.

15. The mechanical reduction gear according to claim 14, wherein said sun gear is configured to bear axially in operation against said bearing surface by means of a single washer or a single coating.

* * * * *